United States Patent
Oishi et al.

(10) Patent No.: US 8,299,988 B2
(45) Date of Patent: Oct. 30, 2012

(54) PULSE SIGNAL DELAY CIRCUIT AND LED DRIVE CIRCUIT

(75) Inventors: Yoshihiro Oishi, Nara (JP); Makoto Fujiwara, Ibaraki (JP)

(73) Assignee: Sharp Kabushiki Kaisha, Osaka (JP)

( * ) Notice: Subject to any disclaimer, the term of this patent is extended or adjusted under 35 U.S.C. 154(b) by 877 days.

(21) Appl. No.: 12/335,264

(22) Filed: Dec. 15, 2008

(65) Prior Publication Data

US 2009/0167398 A1    Jul. 2, 2009

(30) Foreign Application Priority Data

Dec. 26, 2007  (JP) ................................ 2007-334623

(51) Int. Cl.
*G09G 3/32*   (2006.01)
(52) U.S. Cl. ............................. 345/82; 345/98; 345/100
(58) Field of Classification Search .................... 345/82, 345/98, 100; 323/271, 283; 455/208, 566
See application file for complete search history.

(56) References Cited

U.S. PATENT DOCUMENTS

| | | | | |
|---|---|---|---|---|
| 3,983,488 A | * | 9/1976 | Bush et al. | 455/208 |
| 6,396,250 B1 | * | 5/2002 | Bridge | 323/283 |
| 7,117,019 B2 | * | 10/2006 | Abbasi | 455/566 |
| 7,268,448 B2 | * | 9/2007 | Hasegawa | 307/31 |
| 2002/0149556 A1 | * | 10/2002 | Matsueda | 345/98 |
| 2004/0239610 A1 | * | 12/2004 | Ishii | 345/100 |
| 2007/0139023 A1 | * | 6/2007 | Hasegawa | 323/271 |
| 2010/0177626 A1 | * | 7/2010 | Otaguro | 369/215.1 |

FOREIGN PATENT DOCUMENTS

JP    2006-114324 A    4/2006

* cited by examiner

*Primary Examiner* — Thuy Pardo
(74) *Attorney, Agent, or Firm* — Birch, Stewart, Kolasch & Birch, LLP (57) ABSTRACT

A pulse signal delay circuit comprises: a first pulse edge delay circuit for generating a first delay timing signal for sequentially outputting a first edge detection delay timing gained by detecting the rising edge of an input pulse signal and delaying the detection timing by a constant delay time a predetermined number of times; a second pulse edge delay circuit for generating a second delay timing signal for sequentially outputting a second edge detection delay timing gained by detecting the falling edge of the input pulse signal and delaying the detection timing by the delay time the number of times; and a delay pulse signal generating circuit for generating and outputting delay pulse signals rising and falling according to the first and second edge detection delay timings, respectively, from the first and second delay timing signals, the first and second edge detection delay timings delayed the same number of times.

6 Claims, 10 Drawing Sheets

PULSE SIGNAL DELAY CIRCUIT AND LED DRIVE CIRCUIT

CROSS REFERENCE TO RELATED APPLICATION

This Nonprovisional application claims priority under 35 U.S.C. §119(a) on Patent Application No. 2007-334623 filed in Japan on Dec. 26, 2007, the entire contents of which are hereby incorporated by reference.

BACKGROUND OF THE INVENTION

1. Field of the Invention

The present invention relates to a pulse signal delay circuit which can be applied in an LED drive circuit and the like and generates a delay pulse signal by copying an input pulse signal with a delay of a predetermined delay time, as well as an LED drive circuit using the same.

2. Description of the Related Art

In an LED drive circuit and the like using a DC/DC converter technology, a smoothing condenser is charged by a booster circuit via Schottky diode and a constant voltage value is set. A current is supplied to a load connected parallel to the smoothing condenser from the booster circuit and its smoothing condenser. Recently, as the size of devices has been reduced, the use of a ceramic condenser as a smoothing condenser has increased. In some cases, ceramic condensers having a relatively large capacitance used as a smoothing condenser emit abnormal sounds due to vibrations caused by the piezoelectricity of the dielectric material used in the condenser as a voltage is applied. According to the prior art, such abnormal sounds have been prevented by changing the circuit constant or the direction in which the condenser is mounted.

Meanwhile, backlights for displays in portable apparatuses such as cellular phones have been converted to LEDs. In particular, in a case where an IC for an LED driver having the booster circuit as described above and a smoothing condenser using ceramics are combined in an apparatus which is used in close proximity to the ear, such as a cellular phone, abnormal sounds as described above cannot be ignored. In particular, in cellular phones, the sound quality is made important such that it is becoming inevitable to prevent the emission of abnormal sounds from the apparatus. Against this background, it has been proposed to make the pulse width modulated signal (PWM signal) for driving the LED circuit be 20 kHz or higher, as disclosed in Japanese Unexamined Patent Publication 2006-114324, as a measure for preventing abnormal sounds.

However, the following problems arise with the method for setting the frequency of the PWM signal high as disclosed in the Japanese Unexamined Patent Publication 2006-114324. First, the range of the frequency of the PWM signal is limited, and thus, the freedom in setting the frequency is decreased and the freedom in designing is decreased. Second, in the case of driving an LED circuit in which LEDs are aligned in an array by aligning a number of LED series circuits in parallel where a number of LEDs are connected in series in the same direction all the LED series circuits are turned on and off simultaneously at a high frequency, and therefore, the load is suddenly changed, and thus, the ceramic condenser used in the constant voltage power supply vibrates due to the piezoelectricity, thereby causing sounds. That is, a further measure is required to prevent the emission of abnormal sounds in LED circuits where LEDs are aligned in an array.

Figure 8:
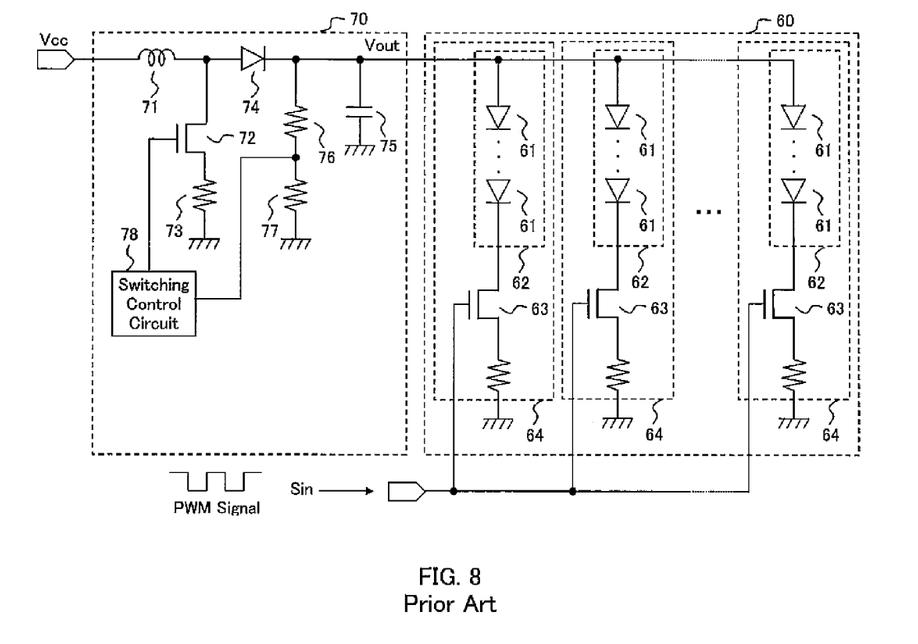
FIG. 8 is a circuit diagram showing an example of a conventional circuit configuration where an LED circuit is driven by a single drive signal.

The second problem will now be described with reference to FIGS. 8 and 9. FIG. 8 shows an example of a circuit configuration of an LED circuit 60 and a booster circuit 70 for supplying a current in order to drive the respective LEDs in the LED circuit 60. The LED circuit 60 is formed by connecting a number (n) of circuit units 64 ($64_1$ to $64_n$) in parallel, which are formed by connecting an LED series circuit 62, where a number of LEDs 61 are connected in series in the same direction, and a drive transistor 63 in series. The booster circuit 70 is a DC/DC converter circuit which switches the input current supplied from an external power supply voltage Vcc via a coil 71 through a switching transistor 72 made up of an N channel type MOSFET and a resistor 73, and thus, boosts the power supply voltage Vcc and charges a smoothing condenser 75 with the boosted voltage via Schottky barrier diode 74 so that the voltage is smoothed. The switching transistor 72 is turned on and off when a switching control circuit 78 monitors the voltage gained by dividing the output voltage Vout smoothed by the smoothing condenser 75 by resistors 76 and 77, and the output voltage Vout is controlled so as to have a desired voltage value. In an example of the circuit configuration in FIG. 8, the output voltage Vout from the booster circuit 70 is supplied to the anode side of each LED series circuit 62 in the LED circuit 60. A pulse width modulated signal (PWM signal) Sin for driving the LED circuit 60 is supplied to the gate of the drive transistor 63 in each circuit unit 64 from the outside as a gate signal which is inputted to all of the gates.

When the frequency of the PWM signal Sin is set to a certain frequency or higher (for example, 200 Hz or higher), the brightness is leveled for the human eye. Therefore, each circuit unit 64 is controlled so that the same amount of current flows through the LEDs 61, and it becomes possible to adjust the brightness of the entirety of the LED circuit 60 by changing the duty ratio of the PWM signal Sin.

Figure 9:
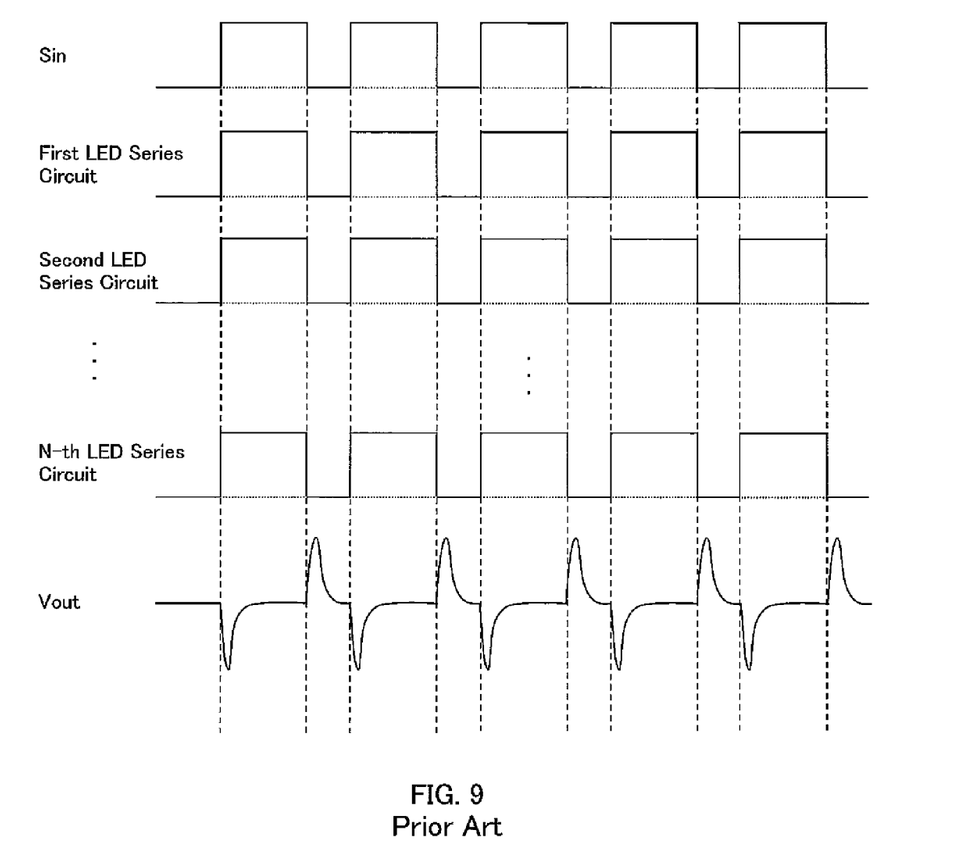
FIG. 9 is a voltage waveform diagram showing the fluctuation in the output voltage of the booster circuit in the circuit configuration shown in FIG. 8.

When the drive transistor 63 in each circuit unit 64 is controlled so as to be turned on and off according to the same timing, however, the LED drive current which flows through each circuit unit 64 changes greatly according to the timing of the switching for turning on and off the drive transistor 63, and therefore, as shown in FIG. 9, the output voltage Vout fluctuates by approximately several volts. This fluctuation of the output voltage Vout at the time of switching is described with reference to FIG. 9.

When the PWM signal Sin drops, the drive transistor 63 is turned off. As a result, the supply of the current to each LED series circuit 62 is stopped, the current load of the booster circuit 70 is reduced, and the output voltage Vout of the booster circuit 70 is increased to a set voltage or higher. In addition, the output of current is blocked on the LED circuit 60 side, and therefore, it becomes unnecessary for the booster circuit 70 to supply a current to the LED circuit 60, being a load circuit, and the booster circuit 70 stops the operation when the voltage of the smoothing condenser 75 returns to the set value.

Next, when the PWM signal Sin rises, the drive transistor 63 is turned on, and the supply of a current to each LED series circuit 62 suddenly starts, and therefore, the current load in the booster circuit 70 becomes heavier. As a result, a current is supplied from the smoothing condenser 75 in response to a sudden increase in the current load, and therefore, the output voltage Vout of the smoothing condenser 75 lowers. As the output voltage Vout lowers, the booster circuit 70 starts the boosting operation, and the voltage of the smoothing condenser 75 lowers before the boosting operation starts. After the booster circuit 70 starts the boosting operation, the boosting operation is controlled so that the voltage of the smoothing condenser 75 is recovered to the set value, and thereby recovering the set value.

However, a sudden fluctuation in the output voltage Vout when the PWM signal Sin rises and drops generates vibrations due to the piezoelectricity of the smoothing condenser 75, thereby causing unnecessary sounds.

Figure 10:
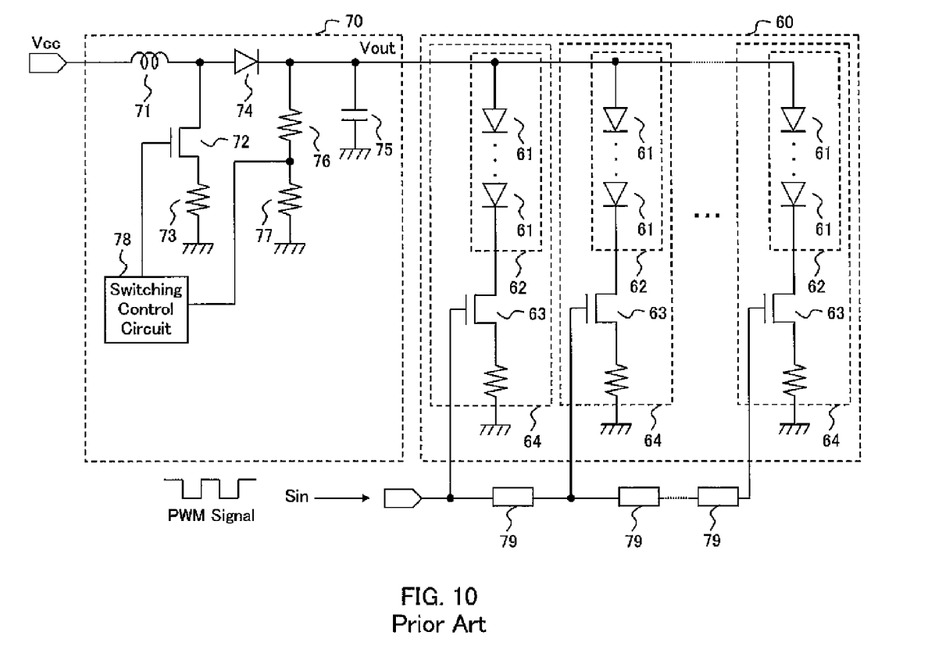
FIG. 10 is a circuit diagram showing another example of a circuit configuration where the LED circuit shown in FIG. 8 is driven with a time difference.

It is herein considered that the amplitude of the sudden fluctuation of the output voltage Vout is restricted in order to prevent the smoothing condenser 75 from vibrating. As one measure in this case, it is considered to drive the drive transistors 63 in a number of circuit units 64 with a time difference by shifting the drive time. As shown in FIG. 10, for example, the PWM signal Sin is directly inputted into the gate of the drive transistor 63 in one circuit unit $64_1$ and delays signals $Sd_2$ to $Sd_n$ gained by delaying the PWM signal Sin in sequence using delay circuits 79 (for example, inverter column circuits) of which the number is the same as the number (n−1) of other circuit units $64_2$ to $64_n$, and thus, it is considered to input the signals to the gates of the drive transistors 63 in the circuit units $64_2$ to $64_n$, respectively.

However, the following problem arises with this measure. That is, the rising edge delay time for the input pulse signal in the delay circuit 79 is not necessarily equal to the falling edge delay time, and therefore, the duty ratio of the PWM signal Sin changes whenever the PWM signal passes through the delay circuit 79. As a result, the brightness becomes inconsistent between the circuit units 64, and this causes flickering throughout the entirety of the LED circuit 60.

SUMMARY OF THE INVENTION

The present invention has been made in view of the problems, and a first object thereof is to provide a pulse signal delay circuit which can precisely delay the input pulse signal by a constant delay time while maintaining the duty ratio so that the LED circuit can be driven with a precise time difference. In addition, a second object of the present invention is to provide an LED drive circuit which can drive an LED circuit while preventing inconsistency in the brightness, flickering and emission of sound from a condenser without restricting the freedom in setting the frequency of the PWM signal for driving LED.

In order to achieve the first object, the pulse signal delay circuit according to the present invention is characterized as first characteristics by comprising: a first pulse edge delay circuit for generating a first delay timing signal for sequentially outputting a first edge detection delay timing gained by detecting a rising edge of an input pulse signal and delaying a detection timing of the rising edge by a preset delay time a predetermined number of times within one period of the input pulse signal; a second pulse edge delay circuit for generating a second delay timing signal for sequentially outputting a second edge detection delay timing gained by detecting a falling edge of the input pulse signal and delaying a detection timing of the falling edge by the delay time the predetermined number of times within one period of the input pulse signal; and a delay pulse signal generating circuit for generating delay pulse signals, of which the number is the same as the predetermined number of times of delays, from the first delay timing signal and the second delay timing signal for each combination of the first edge detection delay timing and the second edge detection delay timing delayed the same number of times, the delay pulse signals rising according to the first edge detection delay timing and falling according to the second edge detection delay timing, and for outputting the generated delay pulse signals.

In the pulse signal delay circuit according to the first characteristics, the first edge detection delay timing generated by the first pulse edge delay circuit is gained by delaying the detection timing of the rising edge of the input pulse signal by a constant delay time a predetermined number of times, and the second edge detection delay timing generated by the second pulse edge delay circuit is gained by delaying the detection timing of the falling edge of the input pulse signal by the same delay time as that of the first edge detection delay timing a predetermined number of times, and therefore, the Mth delay pulse signal which rises according to the first edge detection delay timing gained through M (M is a natural number) times of delays generated by the delay pulse signal generating circuit and falls according to the second edge detection delay timing gained through M times of delays, and the Nth delay pulse signal which rises according to the first edge detection delay timing gained through N (N is a natural number other than M) times of delays and falls according to the second edge detection delay timing gained through N times of delays have the same pulse width between the rising edge and the falling edge, and therefore, the duty ratio can be maintained equal among all the delay pulse signals. In addition, the delay time between two delay pulse signals front and rear can be made equal. As a result, a pulse signal delay circuit can be provided which can drive an LED circuit with precise time difference and can precisely delay an input pulse signal by a constant delay time while maintaining the duty ratio.

Furthermore, the pulse signal delay circuit according to the first characteristics is characterized as second characteristics in that the first pulse edge delay circuit comprises a first counter, the first counter starting a counting operation with a clock period of a system clock after the rising edge is detected, accepts the delay time as a delay counter value of a plurality of bits with one period of the system clock as a unit time, generates the first edge detection delay timing whenever a counter value of the first counter coincides with the delay counter value, and at the same time, resets the counting operation of the first counter and repeats the counting operation the predetermined number of times, and the second pulse edge delay circuit comprises a second counter, the second counter starting a counting operation with the clock period of the system clock after the falling edge is detected, accepts the delay time as the delay counter value, generates the second edge detection delay timing whenever a counter value of the second counter coincides with the delay counter value, and at the same time, resets the counting operation of the second counter and repeats the counting operation the predetermined number of times.

In the pulse signal delay circuit according to the second characteristics, the first pulse edge delay circuit and the second pulse edge delay circuit can be implemented using a counter circuit. Accordingly, the setting and changing of the delay time can be easily achieved through a simple operation of only changing the delay counter value.

In addition, the pulse signal delay circuit according to the second characteristics has a configuration where the first pulse edge delay circuit and the second pulse edge delay circuit are separate from each other and output the first and second edge detection delay timings in sequence respectively, which are gained by delaying the respective edge detection timings by a preset delay time Δt a predetermined number of times (n), and therefore, the circuit scale can be reduced in comparison with the circuit configuration where a counter circuit is provided for each of delay pulse signals in the same number of patterns as the predetermined number of times of delays (n) in order to individually delay the original input pulse signal.

Furthermore, the pulse signal delay circuit according to the second characteristics is characterized as third characteristics in that the first pulse edge delay circuit comprises a third counter for counting whenever the counter value of the first counter coincides with the delay counter value, in which a timing when a counter value of the third counter changes is the first edge detection delay timing and a counter output of the third counter is outputted as the first delay timing signal, and the second pulse edge delay circuit comprises a fourth counter for counting whenever the counter value of the second counter coincides with the delay counter value, in which a timing when a counter value of the fourth counter changes is the second edge detection delay timing and a counter output of the fourth counter is outputted as the second delay timing signal.

In the pulse signal delay circuit according to the third characteristics, the timing according to which the counter value of the third counter changes becomes the first edge detection delay timing and the timing according to which the counter value of the fourth counter changes becomes the second edge detection delay timing, and therefore, the order of the generation of the first and second edge detection delay timing (that is, how many times the timing is generated before) can be identified as the counter value of the third and fourth counters, respectively, and therefore, it becomes easy to acquire the first and second edge detection delay timing gained through the same number of times of delays in the delay pulse signal generating circuit for generating a delay pulse signal by using the first and second edge detection delay timing.

Furthermore, the pulse signal delay circuit according to the third characteristics is characterized as fourth characteristics in that the delay pulse signal generating circuit comprises delay pulse signal generating units of which the number is the same as the predetermined number of times of delays, the delay pulse signal generating units each generating one delay pulse signal, and each of the delay pulse signal generating units comprises individual counter values corresponding to respective natural numbers from 1 to the predetermined number of times of delays, and a flip flop which is set when the counter value of the third counter coincides with one of the individual counter values and reset when the counter value of the fourth counter coincides with one of the individual counter values, and outputs an output of the flip-flop as the one delay pulse signal corresponding to one of the individual counter values.

In the pulse signal delay circuit according to the fourth characteristics, the first delay timing signal and the second delay timing signal in the pulse signal delay circuit according to the third characteristics are identified, and a delay pulse signal generating circuit which can generate delay pulse signals of which the number is the same as the predetermined number of times of delays can be concretely implemented.

Furthermore, the pulse signal delay circuit according to the second to fourth characteristics is characterized as fifth characteristics by further comprising a delay counter value generating circuit for generating the delay counter value and holding the delay counter value at least during operations of the first pulse edge delay circuit and the second pulse edge delay circuit.

In the pulse signal delay circuit according to the fifth characteristics, it becomes possible to reduce the system load of an external apparatus by providing a delay counter value generating circuit instead of the system scale of an external apparatus increasing in the case where a delay counter value is set by the external apparatus such as a microprocessor.

Furthermore, the pulse signal delay circuit according to the fifth characteristics is characterized as sixth characteristics in that the delay counter value generating circuit comprises a fifth counter for performing a counting operation with the clock period of the system clock and a sixth counter for performing a counting operation with a different clock period from the clock period of the system clock, wherein the sixth counter starts the counting operation with the different clock period after the power-on reset is released, stops the counting operation when a counter value of the fifth counter becomes a predetermined value, and holds a counter value when the counting operation is stopped as the delay counter value while the power is on.

In the pulse signal delay circuit according to the sixth characteristics, a delay counter value generating circuit which can set a delay counter value by adjusting the clock period of the sixth counter can be implemented.

In order to achieve the second object, the LED drive circuit according to the present invention is an LED drive circuit for driving an LED circuit where a plurality of circuit units, in which an LED series circuit where a plurality of LEDs are connected in series in the same direction and a drive transistor for driving the LED series circuit are connected in series, are connected in parallel and one end of each of the circuit units is connected to a predetermined drive voltage, and is characterized by comprising the pulse signal delay circuit according to any of the characteristics, wherein the first pulse edge delay circuit and the second pulse edge delay circuit in the pulse signal delay circuit accept a pulse width modulating signal for driving and controlling the LED circuit as the input pulse signal, the delay pulse signals of which the number is the same as the predetermined number of times of delays outputted from the delay pulse signal generating circuit in the pulse signal delay circuit are respectively inputted into gates of the drive transistors in the circuit units in the LED circuit, and the predetermined number of times of delays in the pulse signal delay circuit is set to the same number as the number of the circuit units in the LED circuit or smaller than the number of the circuit units by one.

In the LED drive circuit according to the above described characteristics, the delay pulse signals of which the number is the same as the predetermined number of times of delays outputted from the delay pulse signal generating circuit in the pulse signal delay circuit according to any of the above described characteristics are individually inputted into the gate of the drive transistor in each of the circuit units in the LED circuit so that the LED circuit can be driven with a time difference. As a result, it becomes possible to provide an LED drive circuit which can drive an LED circuit by preventing the inconsistency in the brightness, flickering and the emission of sound from a condenser without restricting the freedom in the setting of the frequency of the PWM signal for driving LED.

DESCRIPTION OF THE PREFERRED EMBODIMENTS

Figure 1:
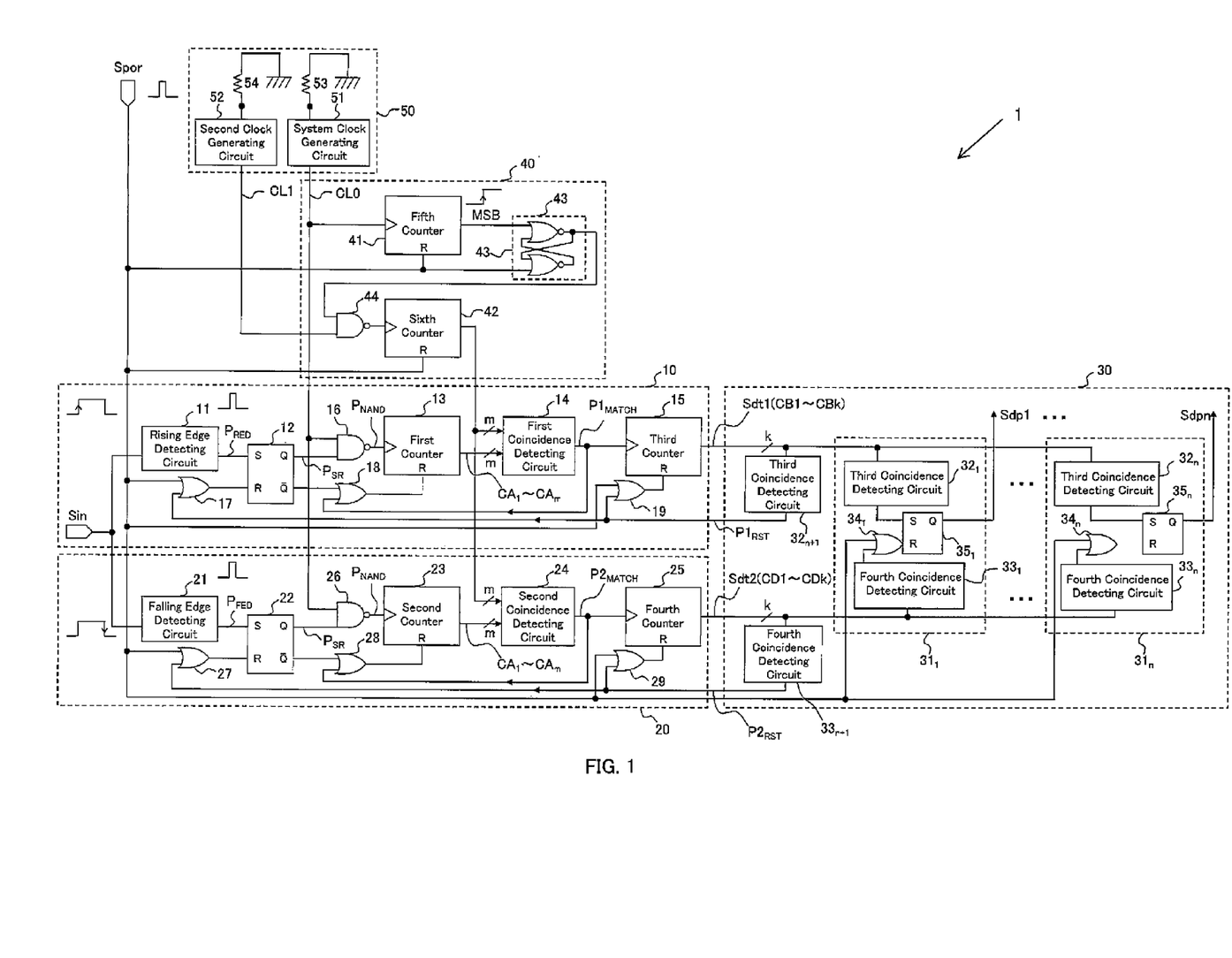
FIG. 1 is a logic circuit block diagram showing the circuit configuration of the pulse signal delay circuit according to one embodiment of the present invention.

In the following, the pulse signal delay circuit and the LED drive circuit according to the embodiments of the present invention will be described with reference to the drawings.
First Embodiment FIG. 1 is a logic circuit block diagram showing the circuit configuration of the pulse signal delay circuit according to the first embodiment of the present invention. The pulse signal delay circuit according to the present embodiment (hereinafter abbreviated to as "present delay circuit") is formed of five circuit block sections. Concretely, as shown in FIG. 1, the present delay circuit 1 is configured by five circuit blocks: a first pulse edge delay circuit 10, a second pulse edge delay circuit 20, a delay pulse signal generating circuit 30, a delay counter value generating circuit 40 and a clock generating circuit 50.

The first pulse edge delay circuit 10 detects a rising edge of the PWM signal Sin being an input pulse signal, and generates a first delay timing signal Sdt1 for sequentially outputting the first edge detection delay timing, gained by delaying the detection timing of the rising edge by a preset delay time $\Delta t$ a predetermined number of times (n) within one period of the PWM signal Sin. The first pulse edge delay circuit 10 is concretely configured by a rising edge detecting circuit 11, an SR flip-flop 12, a first counter 13, a first coincidence detecting circuit 14, a third counter 15, a two-input NAND (negative logic product) circuit 16 and three two-input OR (logic sum) circuits 17 to 19. The rising edge detecting circuit 11 allows the PWM signal Sin to be inputted and outputs a positive pulse which transits at a high level during a certain period of time when a rising edge of the PWM signal Sin is detected. The setting input terminal of the SR flip-flop 12 is connected to the output of the rising edge detecting circuit 11, and the resetting input terminal is connected to the output of the OR circuit 17. A power-on resetting signal Spor is inputted into one input of the OR circuit 17. One input of the NAND circuit 16 is connected to a system clock CL0, the other input is connected to the non-inverting output of the SR flip-flop 12, and the output is connected to the count-up input terminal of the first counter 13. One input of the OR circuit 17 is connected to the inverting output of the SR flip-flop 12, the other input is connected to the output of the first coincidence detecting circuit 14, and the output is connected to the resetting terminal of the first counter 13. The first coincidence detecting circuit 14 compares the delay counter value DLC representing the delay time $\Delta t$ and the output counter value of the first counter 13 (first counter value), and outputs a positive pulse having a width of one period of the system clock CL0 (first coincidence detecting pulse) in the case when they coincide. The input of the third counter 15 is connected to the count-up input terminal of the first coincidence detecting circuit 14 so that the output counter value (third counter value) is outputted to the delay pulse signal generating circuit 30 as the first delay timing signal Sdt1. Here, the change timing of the third counter value in the third counter 15 is conveyed to the delay pulse signal generating circuit 30 as the first edge detection delay timing. Here, the other input of each OR circuit 17 or 18 is connected to the output of the (n+1)th third coincidence detecting circuit $32_{n+1}$ in the below described delay pulse signal generating circuit 30.

The first counter value of the first counter 13 and the delay counter value DLC have the same bit width (m bits), and this bit width is set in accordance with the application of the present delay circuit 1 as described below. The bit width (k bits) of the third counter value in the third counter 15 is set to the minimum value, which makes the maximum value $2^k$ of the third counter value a predetermined number of times of delays (n) or greater.

The power-on resetting signal Spor is a signal which becomes of a high level during the power-on resetting period, and the power-on resetting is released so that the respective regular operations start when the power-on resetting signal Spor transits from the high level to the low level in each circuit into which the power-on resetting signal Spor is inputted.

The second pulse edge delay circuit 20 detects the falling edge of the PWM signal Sin being an input pulse signal, and generates a second delay timing signal Sdt2 for sequentially outputting the second edge detection delay timing gained by delaying the detection timing of the falling edge by a preset delay time $\Delta t$ a predetermined number of times (n). The second pulse edge delay circuit 20 is concretely configured by a falling edge detecting circuit 21, an SR flip-flop 22, a second counter 23, a second coincidence detecting circuit 24, a fourth counter 25, a two-input NAND circuit 26 and three two-input OR circuits 27 to 29. As shown in FIG. 1, the circuit configuration of the second pulse edge delay circuit 20 is basically the same as the circuit configuration of the first pulse edge delay circuit 10, except that the rising edge detecting circuit 11 is replaced with a falling edge detecting circuit 21. The falling edge detecting circuit 21 outputs a positive pulse which transits at a high level for a certain period of time when a falling edge of the PWM signal Sin is detected with an input of the PWM signal Sin. The setting input terminal of the SR flip-flop 22 is connected to the output of the falling edge detecting circuit 21, and the resetting input terminal is connected to the output of the OR circuit 27. The power-on resetting signal Spor is inputted into one input of the OR circuit 27. One input of the NAND circuit 26 is connected to a system clock CL0, the other input is connected to the non-inverting output of the SR flip-flop 22, and the output is connected to the count-up input terminal of the second counter 23. One input of the OR circuit 27 is connected to the inverting output of the SR flip-flop 22, the other input is connected to the output of the second coincidence detecting circuit 24, and the output is connected to the resetting terminal of the second counter 23. The second coincidence detecting circuit 24 compares the delay counter value DLC and the output counter value of the second counter 23 (second counter value), and outputs a positive pulse having a width of one period of the system clock CL0 (second coincidence detecting pulse) in the case when they coincide. The input of the fourth counter 25 is connected to the count-up input terminal of the second coincidence detecting circuit 24 so that the output counter value (fourth counter value) is outputted to the delay pulse signal generating circuit 30 as the second delay timing signal Sdt2. Here, the change timing of the fourth counter value in the fourth counter 25 is conveyed to the delay pulse signal generating circuit 30 as the second edge detection delay timing. Here, the other input of each OR circuit 27 or 28 is connected to the output of the (n+1)th fourth coincidence detecting circuit $33_{n+1}$ in the below described delay pulse signal generating circuit 30.

The second counter value of the second counter 23 and the delay counter value DLC have the same bit width (m bits), and this bit width is set in accordance with the application of the present delay circuit 1 as described below. The bit width (k bits) of the fourth counter value in the fourth counter 25 is set to the minimum value, which makes the maximum value $2^k$ of the fourth counter value a predetermined number of times of delays (n) or greater in the same manner as the third counter value in the third counter 15.

Figure 2:
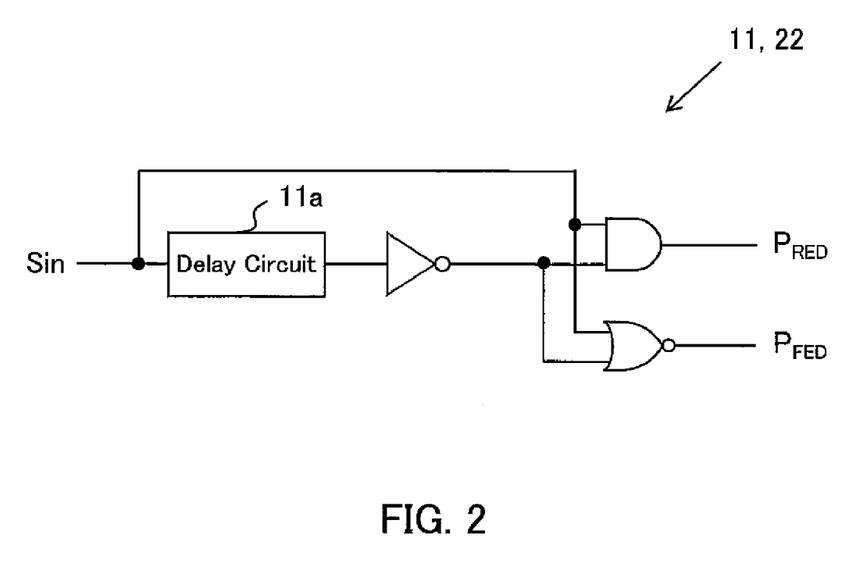
FIG. 2 is a logic circuit block diagram showing one example of the circuit configuration of a rising edge detecting circuit and a falling edge detecting circuit in the pulse signal delay circuit shown in FIG. 1.

The rising edge detecting circuit 11 in the first pulse edge delay circuit 10 and the falling edge detecting circuit 21 in the second pulse edge delay circuit 20 can be configured so as to share part of the circuits, and for example, it is possible to provide a circuit configuration where a delay circuit 11a is shared as shown in FIG. 2. Here, a well-known circuit configuration, such as a series circuit for inverters or an RC delay circuit, can be used for the delay circuit 11a.

The delay pulse signal generating circuit 30 individually generates n delay pulse signals Sdp1 to Sdpn which rise according to the first edge detection delay timing and fall according to the second edge detection delay timing from the first delay timing signal Sdt1 and the second delay timing signal Sdt2 for each combination of the first edge detection delay timing and the second edge detection delay timing, which are delayed by the same number of times, and outputs these signals. The delay pulse signal generating circuit 30 is concretely configured by delay pulse signal generating units 31i (i=1 to n) which generate one delay pulse signal Sdpi (i=1 to n) and of which the number is the same as the predetermined number of times of delays (n).

Each delay pulse signal generating unit 31i is configured by: a third coincidence detecting circuit 32i which has an individual counter value NCi being a binary code corresponding to the respective order (i), and compares the third counter value in the third counter 15, being the first delay timing signal Sdt1, and the individual counter value NCi so as to output a positive pulse during the period when the two counter values coincide; a fourth coincidence detecting circuit 33i which compares the fourth counter value in the fourth counter 25, being the second delay timing signal Sdt2, and the individual counter value NCi so as to output a positive pulse during the period when the two counter values coincide; an OR circuit 34i where the power-on resetting single Spor inputs into one input, and the output of the fourth coincidence detecting circuit 33i is connected to the other input; and an SR flip-flop 35i where the output of the third coincidence detecting circuit 32i is connected to the setting input terminal, and the output of the OR circuit 34i is connected to the resetting input terminal.

The delay pulse signal generating circuit 30 is provided with the (n+1)th third coincidence detecting circuit $32_{n+1}$, and the (n+1)th fourth coincidence detecting circuit $33_{n+1}$ in addition to the respective delay pulse signal generating units 31i (i=1 to n).

The delay counter value generating circuit 40 generates a delay counter value DLC and holds the delay counter value DLC at least during the operation of the first pulse edge delay circuit 10 and the second pulse edge delay circuit 20, and at the same time, stably outputs the delay counter value to the first pulse edge delay circuit 10 and the second pulse edge delay circuit 20. The delay counter value DLC is generated as a binary code, which is gained by quantizing the delay time Δt with one period of the system clock CL0 as a unit of time in the delay counter value generating circuit 40. The delay counter value generating circuit 40 is configured by a fifth counter 41 which operates to count with the clock period of the system clock CL0, a sixth counter 42 which operates to count with the clock period of a second clock CL1 which oscillates with a period different from that of the system clock CL0, an SR latch circuit 43 and a two-input NAND circuit 44.

The system clock CL0 is inputted into the count-up input terminal of the fifth counter 41, and the power-on resetting signal Spor is inputted into the resetting terminal. The MSB output (uppermost bit) within the counter output of the fifth counter 41 is connected to the setting input terminal of the SR latch circuit 43, and the power-on resetting signal Spor is inputted into the resetting input terminal of the SR latch circuit 43. The inverting output terminal of the SR latch circuit 43 is connected to one input of the NAND circuit 44, and the second clock CL1 is inputted into the other input. The output of the NAND circuit 44 is connected to the count-up input terminal of the sixth counter 42, and the power-on resetting signal Spor is inputted into the resetting terminal so that the delay counter value DLC is outputted from the output of the counter of which the counting operation has been stopped.

In the above described circuit configuration, the fifth counter 41 starts a count-up operation with the clock period of the system clock CL0 after the release of the power-on reset. One input of the NAND circuit 44 is at the high level immediately after the release of the power-on reset, and therefore, the output of the NAND circuit 44 operates as the clock with the clock period of the second clock CL1, and therefore, the sixth counter 42 also starts a count-up operation with the clock period of the second clock CL1. When the MSB output of the fifth counter 41 transits from "0" to "1", the SR latch circuit 43 is set so that the inverting output of the SR latch circuit 43 transits from "1" to "0." As a result, the output of the NAND circuit 44 stops the clock operation with the clock period of the second clock CL1, and therefore, the count-up operation of the sixth counter 42 is stopped, and the counter value at this point is held within the sixth counter 42 as a delay counter value DLC, and then outputted from the sixth counter 42. The delay counter value DLC outputted from the sixth counter 42 is held during the period when the power-on state is maintained (period before the system reset), and the same operation is repeated after the next release of the power-on reset or after the release of the system reset. The period before the sixth counter 42 starts and stops a count-up operation is not the delay time Δt.

The clock generating circuit 50 is configured by a system clock generating circuit 51, which generates system clock CL0, and a second clock generating circuit 52 which generates second clock CL1. In the present embodiment, the system clock generating circuit 51 and the second clock generating circuit 52 are provided with external resistors 53 and 54 for adjusting the oscillation frequency, respectively. Various types of known circuit configurations can be adopted for the system clock generating circuit 51 and the second clock generating circuit 52, and therefore, the detailed description of the circuit configurations is omitted here because it is not the main part of the invention.

The delay counter value DLC outputted from the sixth counter 42 in the delay counter value generating circuit 40 is determined by the difference (or ratio) in the frequency between the system clock CL0 and the second clock CL1, and therefore, the frequency (or period) of the second clock CL1 is adjusted relative to the system clock CL0, and thus, it becomes possible to change the delay counter value DLC from the outside. In the present embodiment, the resistance value of the external resistor 54 is adjusted or set to an appropriate value so that the frequency (or period) of the second clock CL1 can be adjusted relative to the system clock CL0.

Though the present embodiment has a configuration where a delay counter value generating circuit 40 and a clock generating circuit 50 are provided within the present delay circuit 1, it is not necessary for these circuits 40 and 50 to be provided within the present delay circuit 1, and the system clock CL0 and the delay counter value DLC may be supplied to the present delay circuit 1 from an external apparatus such as a microprocessor. In the case where the delay counter value DLC is supplied from an external apparatus to the present delay circuit 1, it is possible to change the delay counter value DLC during system operation, and thus, this is appropriate for applications where such a change is necessary.

Figure 3:
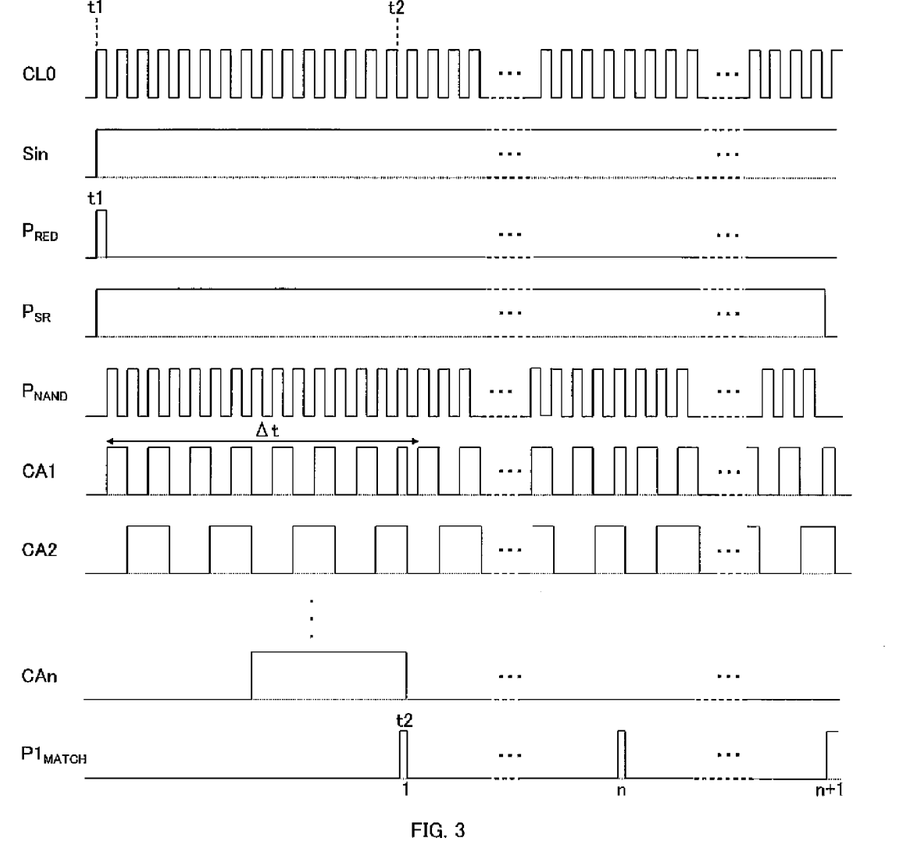
FIG. 3 is a timing diagram showing the signal waveforms of various types of inputs and internal nodes related to the operation of the first pulse edge delay circuit in the pulse signal delay circuit shown in FIG. 1.
Figure 4:
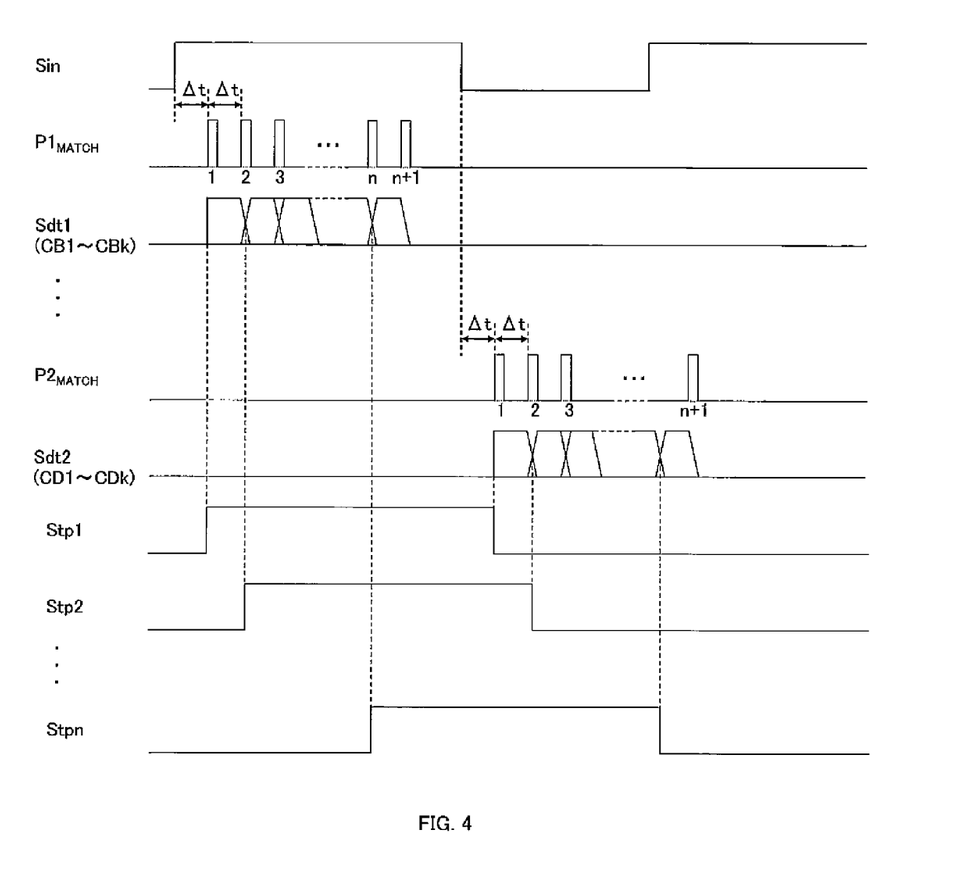
FIG. 4 is a timing diagram showing the signal waveforms of various types of inputs and internal nodes related to the operation of the first pulse edge delay circuit and the delay pulse signal generating circuit in the pulse signal delay circuit shown in FIG. 1.

Next, the operation of the first pulse edge delay circuit 10, being the main portion of the present delay circuit 1, the second pulse edge delay circuit 20 and the delay pulse signal generating circuit 30 after the release of the power-on reset is described with reference to FIGS. 1, 3 and 4. FIG. 3 is a timing diagram showing signal waveforms of various types of inputs and internal nodes related to the operation of the first pulse edge delay circuit 10. FIG. 4 is a timing diagram showing signal waveforms of various types of inputs and internal nodes related to the operation of the first pulse edge delay circuit 10 and the delay pulse signal generating circuit 30. It is assumed that the PWM signal Sin, being an input pulse signal, is inputted into the present delay circuit 1 in such a state that the delay counter value DLC is held in and outputted from the sixth counter 42.

First, the circuit operation of the first pulse edge delay circuit 10 is described. As described below, in the operation at one period before the PWM signal Sin, the output of the (n+1)th third coincidence detecting circuit $32_{n+1}$ of the delay pulse signal generating circuit 30 returns to a low level after outputting a positive pulse immediately before the completion of the previous operation, and therefore, the output of the OR circuit 17 after the release of the power-on reset becomes of a low level after the positive pulse has been outputted. That is, the SR flip-flop 12 is standing by in a reset state. As shown in FIG. 3, when the PWM signal Sin rises in this state (time t1), the rising edge detecting circuit 11 outputs a rising edge detecting pulse $P_{RED}$ so that the SR flip-flop 12 is set and the SR latch output $P_{SR}$, being a non-inverting output of the SR flip-flop 12, transits to a high level while an inverting output (not shown) transits to a low level. As a result, the resetting of the first counter 13 is released so that the output $P_{NAND}$ of the NAND circuit 16 outputs an inverting clock of the system clock CL0, and the first counter 13 starts a count-up operation. When the first counter value (CA1 to CAm in FIG. 3) of the first counter 13 and the delay counter value DLC (m bits) coincide (time t2), the first coincidence detecting circuit 14 outputs a first coincidence detecting pulse $P1_{MATCH}$. When the first coincidence detecting pulse $P1_{MATCH}$ is outputted, the first counter 13 is reset once, and subsequently, repeats the count-up operation according to the inverting clock of the system clock CL0. Accordingly, as shown in FIG. 4, the first coincidence detecting circuit 14 repeatedly outputs the first coincidence detecting pulse $P1_{MATCH}$ with the period of the delay time Δt between the start of the count-up operation of the first counter 13 and the coincidence of the first counter value with the delay counter value DLC. The output timing of the first coincidence detecting pulse $P1_{MATCH}$ corresponds to the first edge detection delay timing.

The second pulse edge delay circuit 20 has the same circuit configuration as the first pulse edge delay circuit 10, and therefore, as shown in FIG. 4, the second coincidence detecting circuit 24 repeatedly outputs the second coincidence detecting pulse $P2_{MATCH}$ with the period of the delay time Δt between the start of the count-up operation of the second counter 23 and the coincidence of the second counter value with the delay counter value DLC. The output timing of the second coincidence detecting pulse $P2_{MATCH}$ corresponds to the second detection delay timing.

After the completion of the operation at one period before the PWM signal Sin or after the release of the power-on reset, the third counter 15 is standing by in a reset state in the same manner as the SR flip-flop 12. In this state, as shown in FIG. 4, when the first coincidence detecting pulse $P1_{MATCH}$ is inputted into the count-up input terminal of the third counter 15 with the period of the delay time Δt, the third counter 15 increases the third counter value by one at a time (CB1 to CBk in FIG. 4).

The fourth counter 25 in the second pulse edge delay circuit 20 is also standing by in a reset state after the completion of the operation at one period before the PWM signal Sin or after the release of the power-on reset in the same manner as the third counter 15 in the first pulse edge delay circuit 10. In this state, as shown in FIG. 4, when the second coincidence detecting pulse $P2_{MATCH}$ is inputted into the count-up input terminal of the fourth counter 25 with the period of the delay time Δt, the fourth counter 25 increases the fourth counter value by one at a time (CD1 to CDk in FIG. 4).

In the delay pulse signal generating circuit 30, as shown in FIG. 4, each delay pulse signal generating unit 31$i$ individually generates and outputs delay pulse signals Sdp1 to Sdpn in accordance with the third counter value (CB1 to CBk) of the third counter 15 and the fourth counter value (CD1 to CDk) of the fourth counter 25. Concretely, each delay pulse signal generating unit 31$i$ raises the signal level of the delay pulse signal Sdpi when the third counter value (CB1 to CBk) coincides with its own counter value NCi (i=1 to n), and drops the signal level of the delay pulse signal Sdpi when the fourth counter value (CD1 to CDk) coincides with its own counter value NCi. As a result, each delay pulse signal generating unit 31$i$ outputs each of n delay pulse signals Sdp1 to Sdpn of which the pulse width (Wp) between the rising edge and the falling edge is equal to each other and which are delayed by the same delay time Δt.

When the third counter value (CB1 to CBk) becomes a value which is greater than the n-th individual counter value NCn by one ((n+1) in the decimal system), the (n+1)th third coincidence detecting circuit $32_{n+1}$ outputs the first reset pulse $P1_{RST}$ so that the SR flip-flop 12 and the third counter 15 in the first pulse edge delay circuit 10 are reset, and in response to this, the first counter 13 is also reset, and thus, the first pulse edge delay circuit 10 is ready to detect the rising edge of the PWM signal Sin in the next period. When the fourth counter value (CD1 to CDk) becomes of a value which is greater than the n-th individual counter value NCn by one ((n+1) in the decimal system), the (n+1)th fourth coincidence detecting circuit $33_{n+1}$ outputs the second reset pulse $P2_{RST}$ so that the SR flip-flop 22 and the fourth counter 25 in the second pulse edge delay circuit 20 are reset, and in response to this, the second counter 23 is also reset, and thus, the second pulse edge delay circuit 20 is ready to detect the falling edge of the PWM signal Sin in the next period.

Second Embodiment

Figure 5:
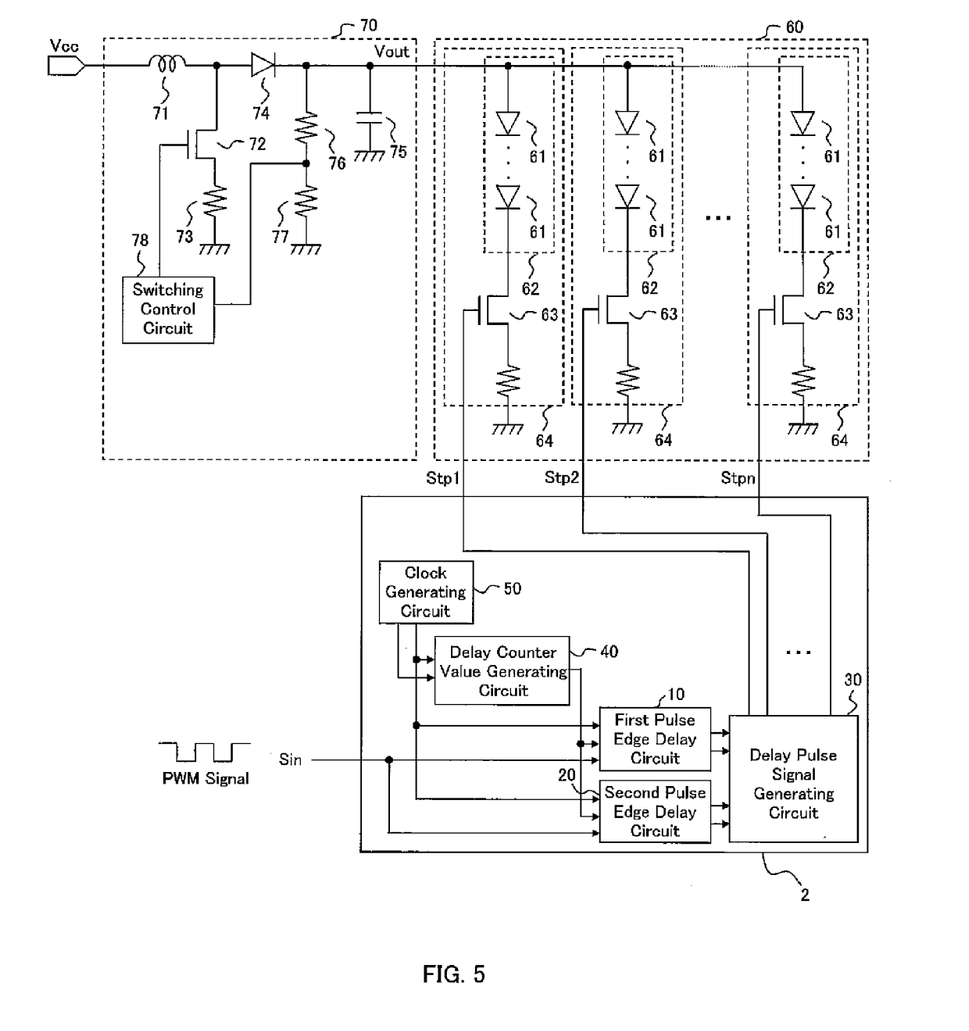
FIG. 5 is a circuit block diagram showing an example of the system configuration in the case where the LED drive circuit according to the present invention is applied to the driving of an LED circuit with a time difference.

Next, the LED drive circuit according to one embodiment of the present invention is described. The LED drive circuit according to the present embodiment (hereinafter abbreviated to as "present drive circuit") is configured using the present delay circuit 1 according to the first embodiment. Accordingly, this circuit configuration is the same as that of the present delay circuit 1 shown in FIG. 1 and is configured by five circuit blocks: a first pulse edge delay circuit 10, a second pulse edge delay circuit 20, a delay pulse signal generating circuit 30, a delay counter value generating circuit 40 and a clock generating circuit 50. As shown in FIG. 5, the present drive circuit 2 is an LED drive circuit for driving an LED circuit 60, which is configured by connecting in parallel a plurality (n) of circuit units 64 ($64_1$ to $64_n$) gained by connecting in series an LED series circuit 62 gained by connecting a plurality of LEDs 61 in series in the same direction and a drive transistor 63, and therefore, the respective bit widths (m bits) of the first counter value of the first counter 13 in the first pulse edge delay circuit 10, the second counter value of the second counter 23 in the second pulse edge delay circuit 20 and the delay counter value DLC are determined in accordance with the concrete circuit configuration of the LED circuit 60 (number of circuit units 64 and the like), the properties of the PWM signal Sin for drive and the frequency of the system clock CL0. In addition, the respective bit widths (k bits) of the third counter value of the third counter 15 in the first pulse edge delay circuit 10 and the fourth counter value of the fourth counter 25 in the second pulse edge delay circuit 20 are determined on the basis of the number (n) of circuit units 64. In the present embodiment, the number of circuit units 64 and the predetermined number of times of delays (n) are set to the same number.

The LED circuit 60 is the same as the LED circuit 60 shown in FIG. 8, and in the same manner as in the configuration in FIG. 8, the output voltage Vout (corresponding to the drive voltage) from the booster circuit 70 is supplied to the anode side of the respective LED series circuits 62 in the LED circuit 60. The booster circuit 70 is a DC/DC converter circuit which increases the power supply voltage Vcc by switching the input current supplied from the power supply voltage Vcc via a coil 71 through a switching transistor 72 made up of an N channel type MOSFET and a resistor 73 and charges a smoothing condenser 75 with the increased voltage via Schottky barrier diode 74 so as to smooth the voltage. The turning on and off of the switching transistor 72 is controlled so that the output voltage Vout becomes a desired voltage value when the switching control circuit 78 monitors the voltage which is gained by dividing the output voltage Vout that has been smoothed by the smoothing condenser 75 via the resistors 76 and 77.

When the number of circuit units 64 is 6 (n=6), the frequency of the PWM signal Sin is within a range from 200 Hz to 400 Hz (period is 2.5 ms to 5.0 ms), and the frequency of the system clock CL0 is within a range from 200 kHz to 2 MHz (period is 0.5 μs to 5 μs), it is necessary for the respective bit widths (m bits) of the delay counter values DLC and the like to have a bit number of a value gained by dividing the maximum period (5.0 ms) of the PWM signal Sin by the minimum period (0.5 μs) of the system clock CL0 of the maximum frequency and further dividing the resulting value by the number (n=6) of the circuit units 64. Accordingly, the respective bit widths of the delay counter values DLC and the like are 11 bits. In addition, it is sufficient for the respective bit widths (k bits) of the third counter value and the fourth counter value to be 3 bits.

Accordingly, in the case of the above described embodiment, the delay pulse signal generating circuit 30 outputs six delay pulse signals Sdp1 to Sdp6. The respective delay pulse signals Sdp1 to Sdp6 are inputted into the gates of the drive transistors 63 in the respectively corresponding circuit units $64_1$ to $64_6$ in the LED circuit 60.

Figure 6:
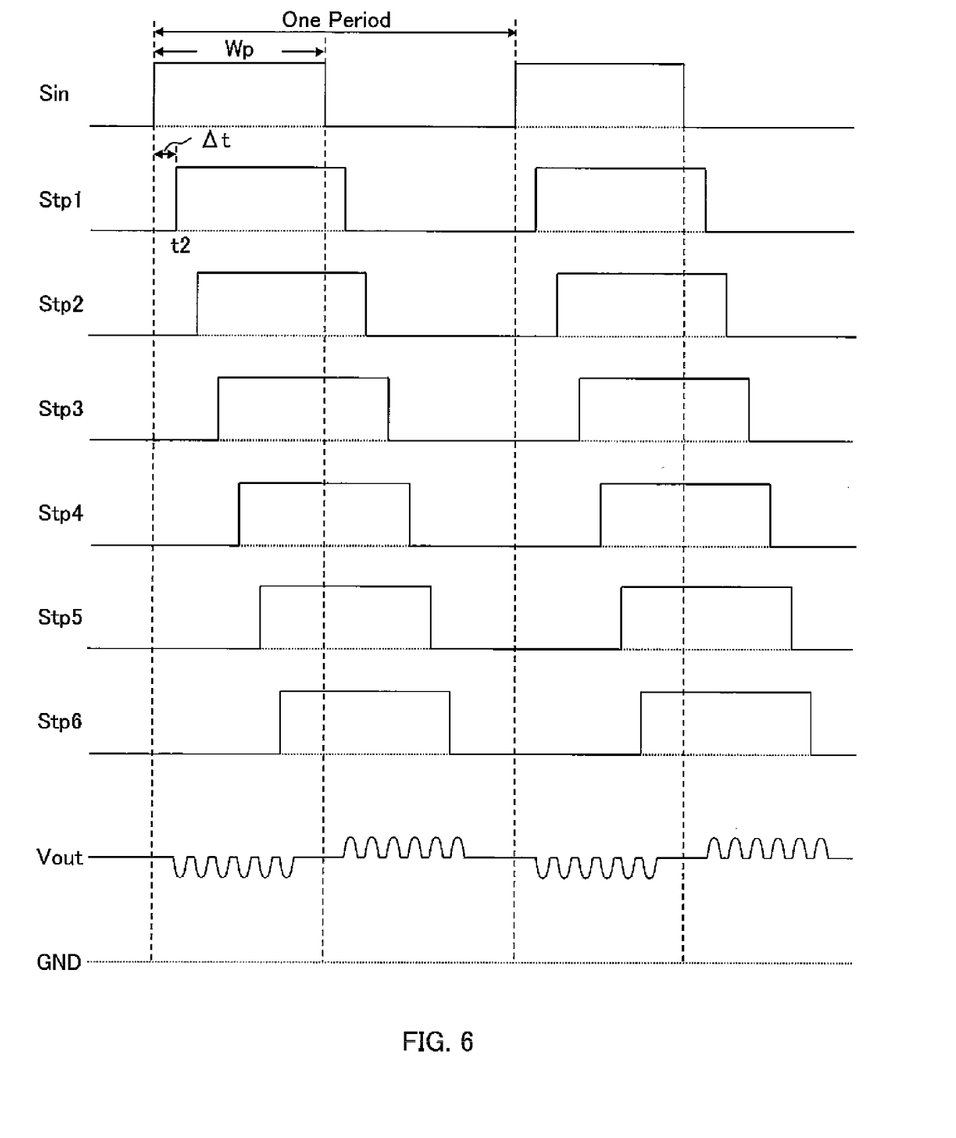
FIG. 6 is a voltage waveform diagram showing the fluctuation in the output voltage of a booster circuit in the case where the LED circuit is driven with a time difference in the LED drive circuit according to the present invention.

FIG. 6 schematically shows the manner how the output voltage Vout outputted from the booster circuit 70 fluctuates in the case where the LED circuit 60 is driven with a time difference in the present drive circuit 2.

Other Embodiments

Next, other embodiments of the present delay circuit 1 and the present drive circuit 2 are described.

(1) In the first embodiment, as shown in FIG. 1, though the present delay circuit 1 is configured by five circuit blocks: a first pulse edge delay circuit 10, a second pulse edge delay circuit 20, a delay pulse signal generating circuit 30, a delay counter value generating circuit 40 and a clock generating circuit 50, the circuit configuration of the respective circuits 10, 20, 30, 40 and 50 are not limited to the circuit configurations concretely illustrated in FIG. 1.

The first and second pulse edge delay circuits 10 and 20 may output the first coincidence detecting pulse $P1_{MATCH}$ in the first coincidence detecting circuit 14 as a first delay timing signal Sdt1 and may output the second coincidence detecting pulse $P2_{MATCH}$ in the second coincidence detecting circuit 24 as a second delay timing signal Sdt2, respectively, for example, without providing the third counter 15 and the fourth counter 25. Here, in this case, it is necessary to change the circuit configuration of the respective delay pulse signal generating units 31i in the delay pulse signal generating circuit 30 so that the i-th delay pulse signal generating unit 31i has such a circuit configuration that can selectively detect only the i-th positive pulse of the first coincidence detecting pulse $P1_{MATCH}$ and the second coincidence detecting pulse $P2_{MATCH}$. A transfer gate for selectively transferring i-th pulse of the first coincidence detecting pulse $P1_{MATCH}$ is provided instead of the third coincidence detecting circuit 32i, for example, so that the SR flip-flop 35i is set by the i-th pulse that has passed through this transfer gate, and at the same time, this transfer gate is turned off after this i-th pulse has transited to a low level, and the set input terminal level of the SR flip-flop 35i is maintained at a low level, turning on the transfer gate which substitutes the third coincidence detecting circuit 32i+1 in the next stage in the configuration, and in the same manner, a transfer gate for selectively transferring i-th pulse of the second coincidence detecting pulse $P2_{MATCH}$ is provided instead of the fourth coincidence detecting circuit 33i, so that the SR flip-flop 35i is reset by inputting the i-th pulse that has passed through this transfer gate into the OR circuit 34i, and at the same time, this low level is maintained after this i-th pulse has transited to a low level, and the transfer gate which substitutes the fourth coincidence detecting circuit 33i+1 in the next stage is turned on in the configuration, and thus, such circuit configuration can be implemented.

Though in the delay counter value generating circuit 40 according to the first embodiment the MSB output within the counter output of the fifth counter 41 is connected to the set input terminal of the SR latch circuit 43, the output of the logical product of the bit other than the MSB in the counter output and the MSB may be connected to the set input terminal of the SR latch circuit 43 in addition to the output of the MSB.

Furthermore, instead of providing the SR latch circuit 43 to the delay counter value generating circuit 40, for example, the two-input NAND circuit 44 may be replaced with a two-input OR circuit so that the MSB output (uppermost bit) within the counter outputs of the fifth counter 41 is connected to one input of the two-input OR circuit, the second clock CL1 is inputted into the other input of the two-input OR Circuit, and the output of the two-input OR circuit is connected to the count-up input terminal of the sixth counter 42.

Furthermore, instead of using the fifth counter 41 and the sixth counter 42 in the delay counter value generating circuit 40, the delay counter value DLC may be directly stored in an m bit nonvolatile register, for example. Here, the nonvolatile register may be configured by a fuse circuit, for example, so that the delay counter value DLC is programmed by selectively cutting fuses at the time of the manufacture of the present delay circuit 1.

Figure 7:
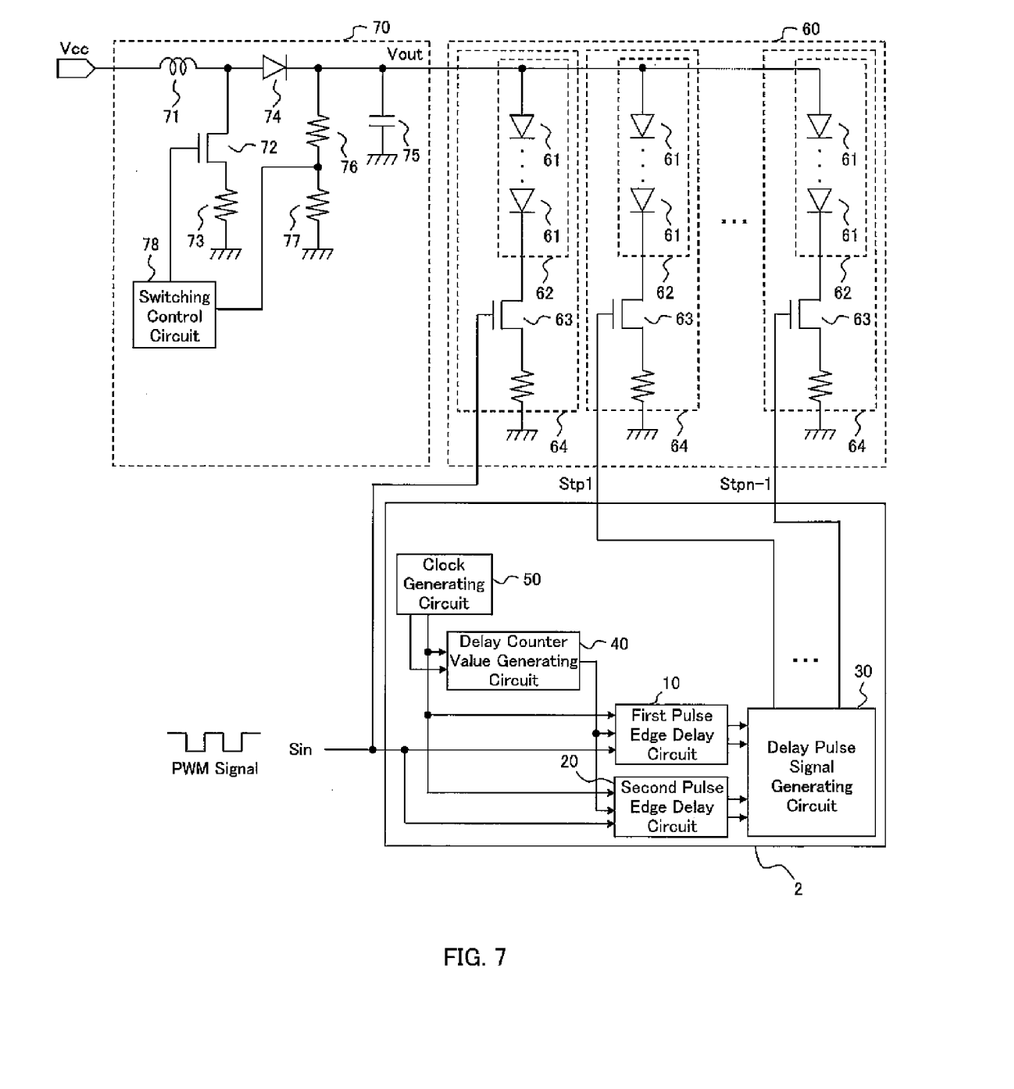
FIG. 7 is a circuit block diagram showing another example of the system configuration in the case where the LED drive circuit according to the present invention is applied to the driving of an LED circuit with a time difference.

(2) Though in the second embodiment the number of the circuit units 64 in the LED circuit 60 and the predetermined number of times of delays in the present drive circuit 2 are set to the same number, the predetermined number of times of delays in the present drive circuit 2 may be smaller than the number of the circuit units 64 by one. In this case, when the number of the circuit units 64 is 6 (n=6), the frequency of the PWM signal Sin is within a range from 200 Hz to 400 Hz (period is 2.5 ms to 5.0 ms), and the frequency of the system clock CL0 is within a range from 200 kHz to 2 MHz (period is 0.5 μs to 5 μs) in the same manner as the example in the second embodiment, as shown in FIG. 7, the predetermined number of times of delays is five and the delay pulse signal generating circuit 30 outputs five delay pulse signals Sdp1 to Sdp5. Thus, the respective delay pulse signals Sdp1 to Sdp5 are inputted into the gates of the drive transistors 63 in the respective circuit units 64$_2$ to 64$_6$ in the LED circuit 60, and the PWM signal Sin is inputted into the gate of drive transistor 63 in the circuit unit 64$_1$.

The present invention can be applied to pulse signal delay circuits which can be applied in LED drive circuits and the like and generate delay pulse signals gained by copying the input pulse signal with delays of predetermined delay time as well as to LED drive circuits using the same.

Although the present invention has been described in terms of the preferred embodiment, it will be appreciated that various modifications and alternations might be made by those skilled in the art without departing from the spirit and scope of the invention. The invention should therefore be measured in terms of the claims which follow.

What is claimed is:

1. A pulse signal delay circuit comprising:
  a first pulse edge delay circuit for generating a first delay timing signal for sequentially outputting a first edge detection delay timing gained by detecting a rising edge of an input pulse signal and delaying a detection timing of the rising edge by a preset delay time a predetermined number of times within one period of the input pulse signal;
  a second pulse edge delay circuit for generating a second delay timing signal for sequentially outputting a second edge detection delay timing gained by detecting a falling edge of the input pulse signal and delaying a detection timing of the falling edge by the delay time the predetermined number of times within one period of the input pulse signal; and
  a delay pulse signal generating circuit for generating delay pulse signals, of which a number is the same as the predetermined number of times of delays, from the first delay timing signal and the second delay timing signal for each combination of the first edge detection delay timing and the second edge detection delay timing delayed the same number of times, the delay pulse signals rising according to the first edge detection delay timing and falling according to the second edge detection delay timing, and for outputting the generated delay pulse signals, wherein
  the first pulse edge delay circuit comprises a first counter, the first counter starting a counting operation with a clock period of a system clock after the rising edge is detected, accepts the delay time as a delay counter value of a plurality of bits with one period of the system clock, as a unit time, generates the first edge detection delay timing whenever a counter value of the first counter coincides with the delay counter value, and at the same time, resets the counting operation of the first counter and repeats the counting operation the predetermined number of times, and
  the second pulse edge delay circuit comprises a second counter, the second counter starting a counting operation with the clock period of the system clock after the falling edge is detected, accepts the delay time as the delay counter value, generates the second edge detection delay timing whenever a counter value of the second counter coincides with the delay counter value, and at the same time, resets the counting operation of the second counter and repeats the counting operation the predetermined number of times.

2. The pulse signal delay circuit according to claim 1, wherein
  the first pulse edge delay circuit comprises a third counter for counting whenever the counter value of the first counter coincides with the delay counter value, in which a timing when a counter value of the third counter changes is the first edge detection delay timing and a counter output of the third counter is outputted as the first delay timing signal, and
  the second pulse edge delay circuit comprises a fourth counter for counting whenever the counter value of the second counter coincides with the delay counter value, in which a timing when a counter value of the fourth counter changes is the second edge detection delay timing and a counter output of the fourth counter is outputted as the second delay timing signal.

3. The pulse signal delay circuit according to claim 2, wherein
  the delay pulse signal generating circuit comprises delay pulse signal generating units of which a number is the same as the predetermined number of times of delays, the delay pulse signal generating units each generating one delay pulse signal and
  each of the delay pulse signal generating units comprises individual counter values corresponding to respective natural numbers from 1 to the predetermined number of times of delays, and a flip-flop which is set when the counter value of the third counter coincides with one of the individual counter values and reset when the counter value of the fourth counter coincides with one of the individual counter values, and outputs an output of the flip-flop as the one delay pulse signal corresponding to one of the individual counter values.

4. The pulse signal delay circuit according to claim 1 further comprising a delay counter value generating circuit for generating the delay counter value and holding the delay counter value at least during operations of the first pulse edge delay circuit and the second pulse edge delay circuit.

5. The pulse signal delay circuit according to claim 4, wherein
the delay counter value generating circuit comprises a fifth counter for performing a counting operation with the clock period of the system clock and a sixth counter for performing a counting operation with a different clock period from the clock period of the system clock, wherein
the sixth counter starts the counting operation with the different clock period after a power-on reset is released, stops the counting operation when a counter value of the fifth counter becomes a predetermined value, and holds a counter value when the counting operation is stopped as the delay counter value while the power is on.

6. An LED drive circuit for driving an LED circuit where a plurality of circuit units, in which an LED series circuit where a plurality of LEDs are connected in series in the same direction and a drive transistor for driving the LED series circuit are connected in series, are connected in parallel and one end of each of the circuit units is connected to a predetermined drive voltage, the LED drive circuit comprising
a pulse signal delay circuit, the pulse signal delay circuit comprising:
a first pulse edge delay circuit for generating a first delay timing signal for sequentially outputting a first edge detection delay timing gained by detecting a rising edge of an input pulse signal and delaying a detection timing of the rising edge by a preset delay time a predetermined number of times within one period of the input pulse signal;
a second pulse edge delay circuit for generating a second delay timing signal for sequentially outputting a second edge detection delay timing gained by detecting a falling edge of the input pulse signal and delaying a detection timing of the falling edge by the delay time the predetermined number of times within one period of the input pulse signal; and
a delay pulse signal generating circuit for generating delay pulse signals, of which a number is the same as the predetermined number of times of delays, from the first delay timing signal and the second delay timing signal for each combination of the first edge detection delay timing and the second edge detection delay timing delayed the same number of times, the delay pulse signals rising according to the first edge detection delay timing and falling according to the second edge detection delay timing, and for outputting the generated delay pulse signals, wherein
the first pulse edge delay circuit and the second pulse edge delay circuit in the pulse signal delay circuit accept a pulse width modulating signal for driving and controlling the LED circuit as the input pulse signal,
the delay pulse signals of which a number is the same as the predetermined number of times of delays outputted from the delay pulse signal generating circuit in the pulse signal delay circuit are respectively inputted into gates of the drive transistors in the circuit units in the LED circuit, and
the predetermined number of times of delays in the pulse signal delay circuit is set to the same number as a number of the circuit units in the LED circuit or smaller than the number of the circuit units by one.

* * * * *